(12) United States Patent
Chen et al.

(10) Patent No.: US 9,561,581 B2
(45) Date of Patent: Feb. 7, 2017

(54) QUICK-REMOVAL SOCKET TOOL (71) Applicant: Shu-Hui Yeh, Changhua County (TW)

(72) Inventors: Chang-Xun Chen, Changhua County (TW); Yi-Ju Chen, Changhua County (TW)

(73) Assignee: Shu-Hui Yeh, Fuxing Township, Changhua County (TW)

( * ) Notice: Subject to any disclaimer, the term of this patent is extended or adjusted under 35 U.S.C. 154(b) by 62 days.

(21) Appl. No.: 14/602,579

(22) Filed: Jan. 22, 2015

(65) Prior Publication Data

US 2016/0214240 A1    Jul. 28, 2016

(51) Int. Cl.
*B23B 31/107* (2006.01)
*B25B 23/00* (2006.01)

(52) U.S. Cl.
CPC ....... *B25B 23/0035* (2013.01); *B23B 31/1071* (2013.01); *B23B 2231/0268* (2013.01); *Y10T 279/17811* (2015.01); *Y10T 279/3406* (2015.01); *Y10T 279/3481* (2015.01)

(58) Field of Classification Search
CPC ............. B23B 31/1071; B25B 23/0035; Y10T 279/17752; Y10T 279/17811; Y10T 279/3406; Y10T 279/3481

See application file for complete search history.

(56) References Cited

U.S. PATENT DOCUMENTS

| | | | |
|---|---|---|---|
| 3,652,099 A * | 3/1972 | Bilz | B23B 31/1071 250/393 |
| 3,658,351 A * | 4/1972 | Benjamin | B23B 31/1071 279/75 |
| 5,682,800 A | 11/1997 | Jore | |
| 6,199,872 B1 * | 3/2001 | Hasan | B23B 31/1071 279/155 |
| 6,345,560 B1 | 2/2002 | Strauch et al. | |
| 7,387,054 B2 * | 6/2008 | Rajotte | B25B 15/001 279/75 |
| 7,891,275 B2 * | 2/2011 | Huang | B25B 23/0035 279/75 |
| 7,954,824 B2 * | 6/2011 | Hu | B25B 23/0035 279/128 |

(Continued)

FOREIGN PATENT DOCUMENTS

| | | | |
|---|---|---|---|
| CN | 201329568 Y | 10/2009 | |
| DE | GB 1256464 A * | 12/1971 | ......... B23B 31/1071 |

(Continued)

OTHER PUBLICATIONS

Taiwan Search Report in corresponding TW patent application No. 103129691 dated Dec. 8, 2015 (6 pages) [w/ English translation].

(Continued)

*Primary Examiner* — Eric A Gates
(74) *Attorney, Agent, or Firm* — Trop Pruner & Hu, P.C.

(57) ABSTRACT

A quick removal socket tool includes: a rod body that has a surrounding wall defining a recess for receiving a screwdriver head and formed with a retaining hole in spatial communication with the recess; and a sliding sleeve sleeved movably on the rod body, formed with an annular groove, and being movable relative to the rod body between a retaining position, where the annular groove is misaligned from the retaining hole so that the positioning ball is disposed within the retaining hole and a groove of the screwdriver head to retain the screwdriver head within the recess, and a release position, where the annular groove is aligned with the retaining hole so that the positioning ball is disposed within the retaining hole and the annular groove to allow for removal of the screwdriver head from the recess.

7 Claims, 7 Drawing Sheets

(56) References Cited

U.S. PATENT DOCUMENTS

| | | | |
|---|---|---|---|
| 8,220,366 B1 | 7/2012 | Fierro et al. | |
| 8,690,164 B2 * | 4/2014 | Meng | B25B 23/0035 |
| | | | 279/155 |
| 8,876,120 B2 * | 11/2014 | Chen | B25B 15/001 |
| | | | 279/128 |
| 9,101,987 B2 * | 8/2015 | Cornwell | B23B 31/107 |
| 2006/0049587 A1 * | 3/2006 | Cornwell | B23B 31/1071 |
| | | | 279/75 |
| 2008/0121075 A1 | 5/2008 | Meng | |
| 2009/0224492 A1 * | 9/2009 | Lin | B25B 15/001 |
| | | | 279/82 |
| 2012/0126497 A1 | 5/2012 | Lin | |
| 2012/0326399 A1 * | 12/2012 | Lin | B23B 31/1071 |
| | | | 279/75 |
| 2013/0340576 A1 | 12/2013 | Rajotte | |

FOREIGN PATENT DOCUMENTS

| | | | |
|---|---|---|---|
| EP | 1122032 | A2 | 8/2001 |
| TW | 505079 | A | 10/2002 |
| TW | 507639 | A | 10/2002 |
| TW | M566281 | A | 12/2003 |
| TW | M247354 | A | 10/2004 |
| TW | M253446 | A | 12/2004 |
| TW | M297818 | A | 9/2006 |
| TW | M300598 | A | 11/2006 |
| TW | M325897 | A | 1/2008 |
| TW | M330893 | A | 4/2008 |
| TW | M338723 | U | 8/2008 |
| TW | M352436 | A | 3/2009 |
| TW | M389000 | A | 9/2010 |
| TW | M425028 | U | 3/2012 |
| TW | I365128 | B1 | 6/2012 |
| TW | 201300207 | A | 1/2013 |
| TW | M453562 | U1 | 5/2013 |
| TW | M456265 | U | 7/2013 |
| TW | M496539 | U | 3/2015 |

OTHER PUBLICATIONS

CN Search Report in corresponding CN application No. 20140471007.1 dated Oct. 24, 2016 (2 pages).

* cited by examiner

QUICK-REMOVAL SOCKET TOOL

FIELD OF THE INVENTION

This invention relates to a socket tool, and more particularly to a quick-removal socket tool.

BACKGROUND OF THE INVENTION

Figure 1:
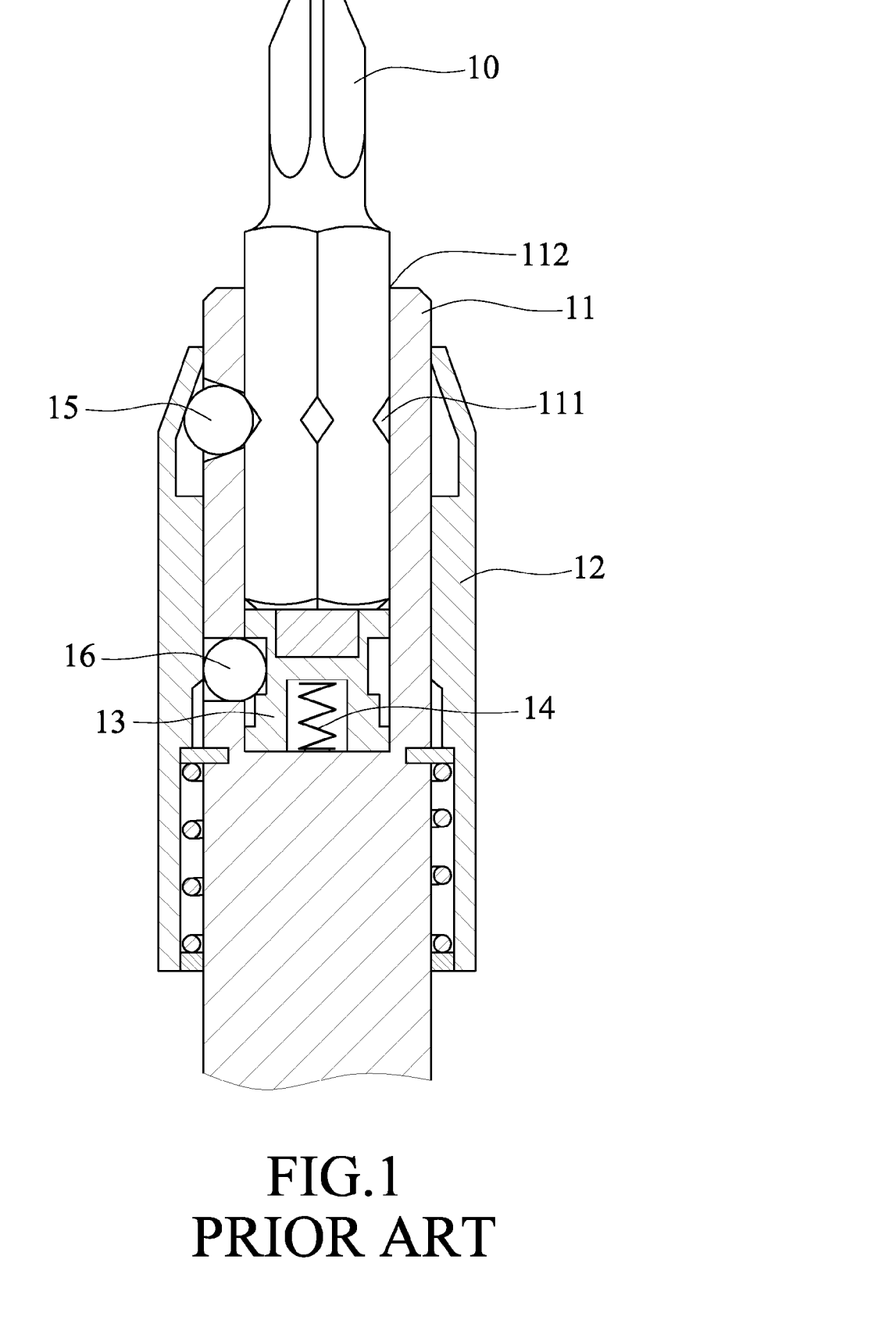
FIG. 1 is a schematic sectional view of a conventional socket tool.

Referring to FIG. 1, a conventional socket tool for mounting removably a screwdriver head 10 includes a rod body 11 having an insert recess 111 and a front end opening 112, a sliding sleeve 12 sleeved movably on the rod body 11, a sliding member 13 disposed movably in the insert recess 111, a spring 14 abutting against the sliding member 13, two positioning balls 15 contactable with the screwdriver head 10, and a retaining ball 16 contactable with the sliding member 13.

Figure 2:
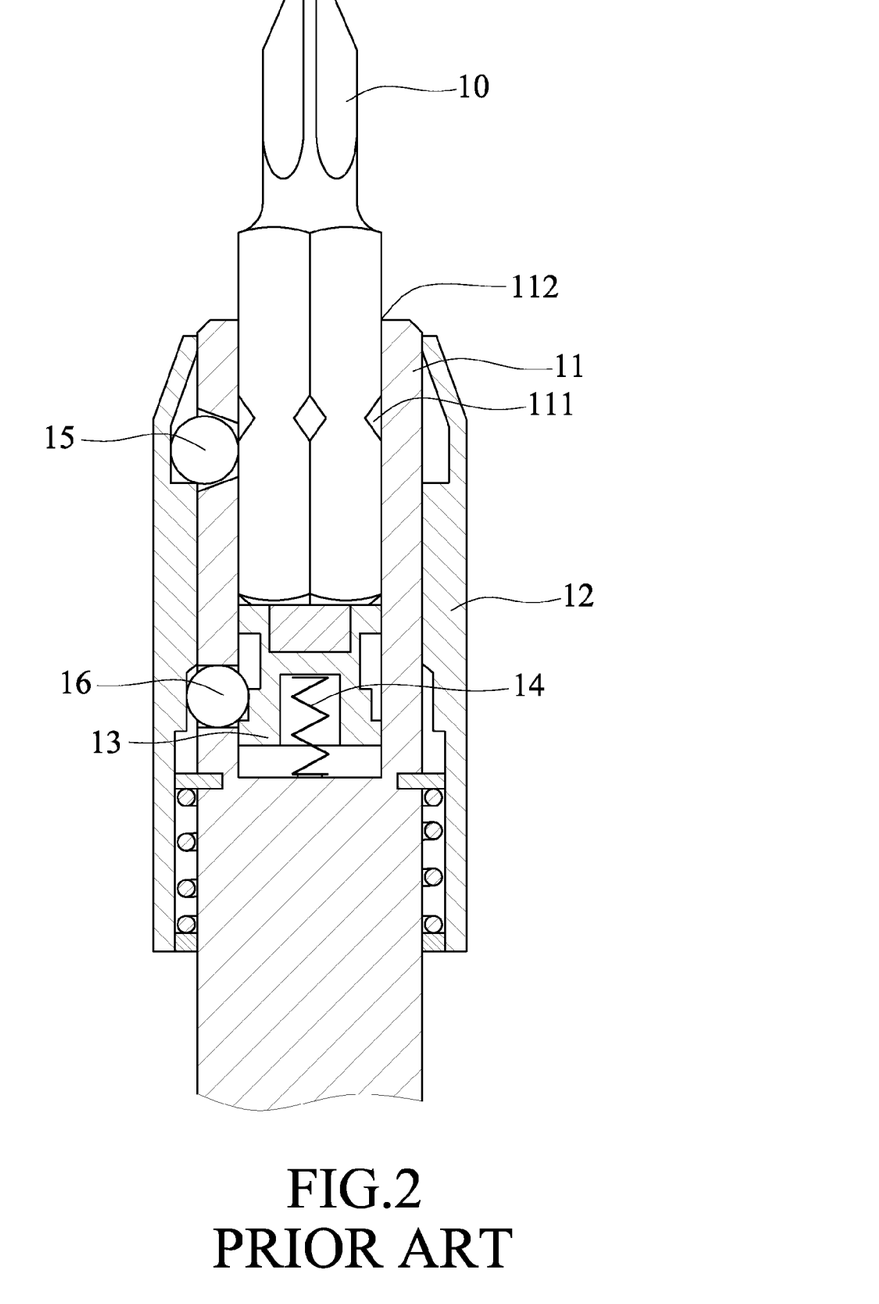
FIG. 2 is a view similar to FIG. 1 but illustrating how to remove a screwdriver head.

When removal of the screwdriver head 10 is desired, the sliding sleeve 12 is moved forwardly on the rod body 11 to remove the positioning balls 15 and the retaining ball 16 from the screwdriver head 10 and the sliding member 13, respectively, thereby allowing the screwdriver head 10 to be removed from the rod body 11, as shown in FIG. 2. However, after a long time period of use, wear is experienced by the retaining ball 16, thereby resulting in difficulties in positioning effectively the sliding member 13 in the rod body 11. Moreover, the retaining ball 16 is located at one side of the rod body 11 so that a retaining force is applied to the sliding member 13 by the retaining ball 16 from only one lateral side of the rod body 11. As a result, the sliding member 13 cannot move smoothly, thereby affecting adversely quick removal of the screwdriver head 10.

SUMMARY OF THE INVENTION

The object of this invention is to provide a quick-removal socket tool that is configured to allow for smooth movement of a sliding member and quick removal of a screwdriver head.

According to this invention, a quick removal socket tool is adapted for mounting removably a screwdriver head, and includes a rod body, and a sliding sleeve sleeved movably on the rod body and formed with an annular groove. The rod body has a surrounding wall that defines a recess for receiving the screwdriver head and that is formed with a retaining hole in spatial communication with the recess. The sliding sleeve is movable relative to the rod body between a retaining position and a release position. When the sliding sleeve is disposed at the retaining position, the annular groove is misaligned from the retaining hole so that the positioning ball is disposed within the retaining hole and a groove of the screwdriver head to retain the screwdriver head within the recess. When the sliding sleeve is disposed at the release position, the annular groove is aligned with the retaining hole so that the positioning ball is disposed within the retaining hole and the annular groove to allow for removal of the screwdriver head from the recess.

BRIEF DESCRIPTION OF THE DRAWINGS

These and other features and advantages of this invention will become apparent in the following detailed description of an embodiment of this invention, with reference to the accompanying drawings, in which.

DETAILED DESCRIPTION OF THE EMBODIMENT

Figure 3:
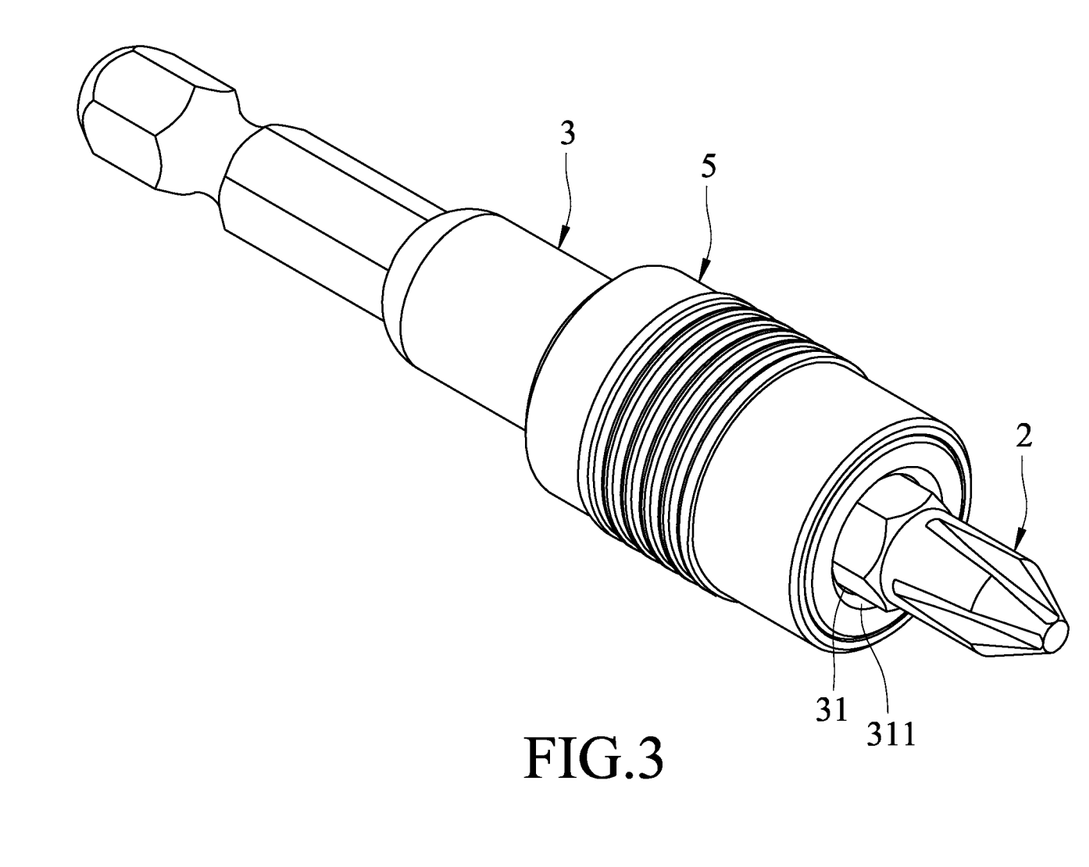
FIG. 3 is a perspective view of the embodiment of a quick-removal socket tool according to this invention.
Figure 4:
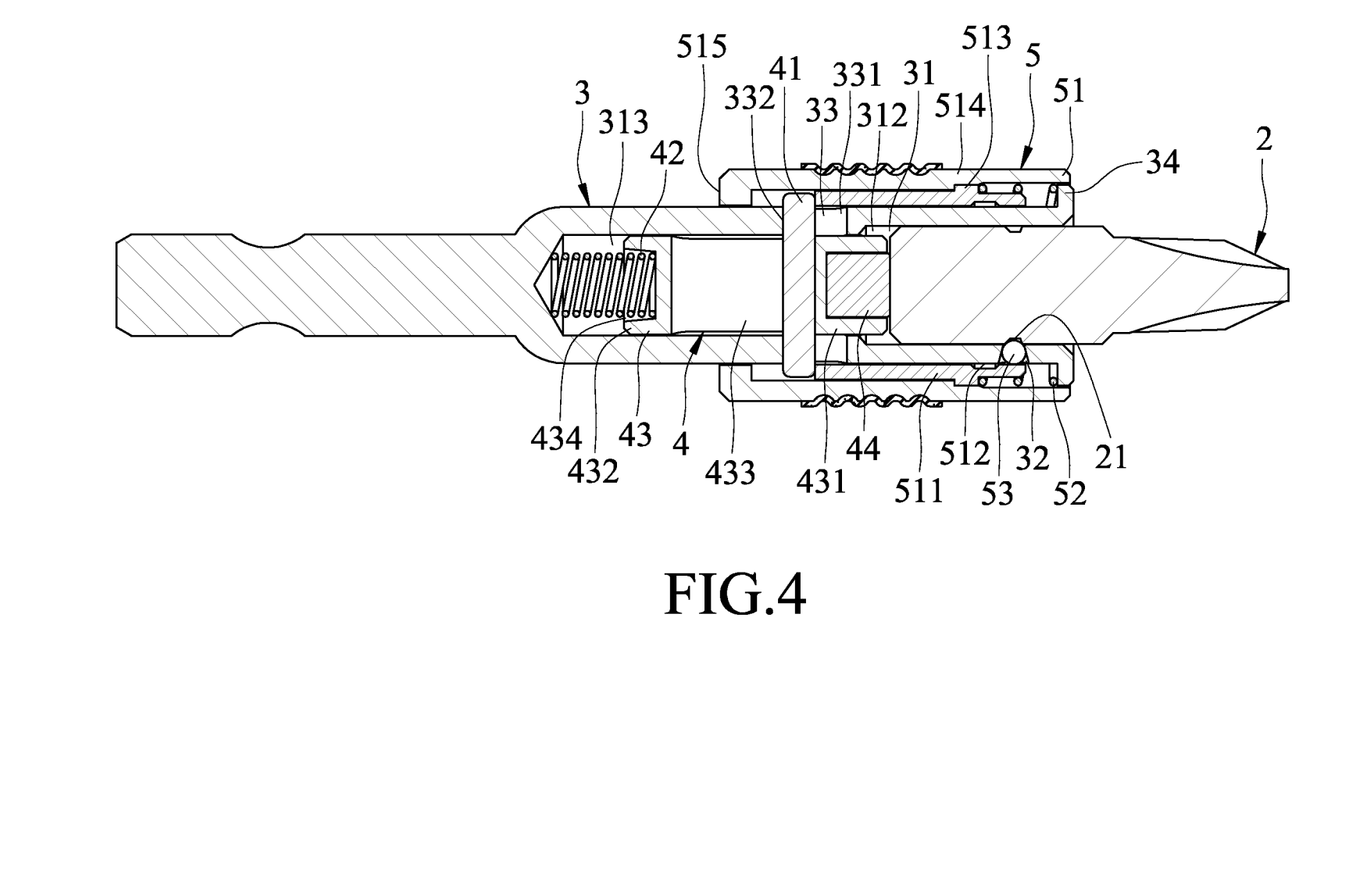
FIG. 4 is a sectional view of the embodiment, illustrating a retaining position of a sliding sleeve.

Referring to FIGS. 3 and 4, the embodiment of a quick removal socket tool is adapted for mounting removably a screwdriver head 2 that has an outer surface formed with a ball-engaging groove 21. The quick removal socket tool includes a rod body 3, a driving device 4, and a retention device 5.

The rod body 3 has an axially extending recess 31 formed in a front end surface thereof, a surrounding wall that defines the recess 31 and that is formed with a retaining hole 32 in spatial communication with the recess 31, a slide slot unit 33 formed in an intermediate portion of the rod body 3, and an end flange 34 extending radially and outwardly from a front end thereof.

The recess 31 has an insert recess section 312 permitting the screwdriver head 2 to be inserted fittingly thereinto, and a guiding recess section 313 disposed behind and connected to the insert recess section 312. Preferably, the cross-section of each of the insert recess section 312 and the screwdriver head 2 is polygonal.

In this embodiment, the retaining hole 32 is frusto-conical, and has an inner end proximate to the screwdriver head 2, and an outer end distal from the screwdriver head 2 and having a diameter greater than that of the inner end. Alternatively, the retaining hole 32 may be a stepped counterbore (not shown).

The slide slot unit 33 is in spatial communication with the recess 31, and has a front end 331 and a rear end 332.

The driving device 4 includes a guide pin 41 extending movably in the slide slot unit 33 and having two ends extending out of the rod body 3, a first resilient member 42 received within the guiding recess section 313 for biasing the guide pin 41 toward the front end 331 of the slide slot unit 33, a sliding member 43 disposed movably in the guiding recess section 313, and a magnet 44 fixed within a front end 431 of the sliding member 43. The guide pin 41 extends through the sliding member 43. The screwdriver head 2 abuts against the front end 431 of the sliding member 43. A rear end 432 of the sliding member 43 abuts against a front end of the first resilient member 42. The sliding member 43 has an intermediate portion formed with a position limiting slot 433 that extends forwardly and rearwardly in the rod body 2 and that permits the guide pin 41 to extend movably therethrough, and a rear end surface 432 formed with a spring-engaging groove 434 receiving the front end of the first resilient member 42. The guide pin 41 is movable between front and rear ends of the position limiting slot 433.

In this embodiment, the magnet 44 is fixed within the front end 431 of the sliding member 43 for attracting the screwdriver head 2.

It should be noted that, the sliding member 43 and the magnet 44 may be omitted from the driving device 4. In this state, the first resilient member 42 and the screwdriver head 2 abut directly against the guide pin 41 (not shown).

The retention device 5 includes a sliding sleeve 51 sleeved movably on the rod body 3, a second resilient member 52 biasing the sliding sleeve 51 rearwardly to contact the guide pin 41 and having a spring force smaller than that of the first resilient member 42, and a positioning ball 53 received within the retaining hole 32.

In this embodiment, the sliding sleeve 51 has a metallic sleeve portion 511 sleeved movably on the rod body 2 and having a rear end that is movable to contact the guide pin 41, and a handle portion 514 sleeved fixedly on the metallic sleeve portion 511, made of high polymer, and having a rear end flange 515. As such, the sliding sleeve 51 has a high rigidity (i.e., is durable), and is comfortable to hold. However, the sleeve portion 511 and the handle portion 514 may be formed as one piece.

In this embodiment, the sliding sleeve 51 has an annular groove 512 formed in an inner surface of the metallic sleeve portion 511, and a stop flange 513 formed in the metallic sleeve portion 511 and disposed behind the end flange 34. The second resilient member 52 has two ends abutting respectively against the end flange 34 and the stop flange 513.

Figure 5:
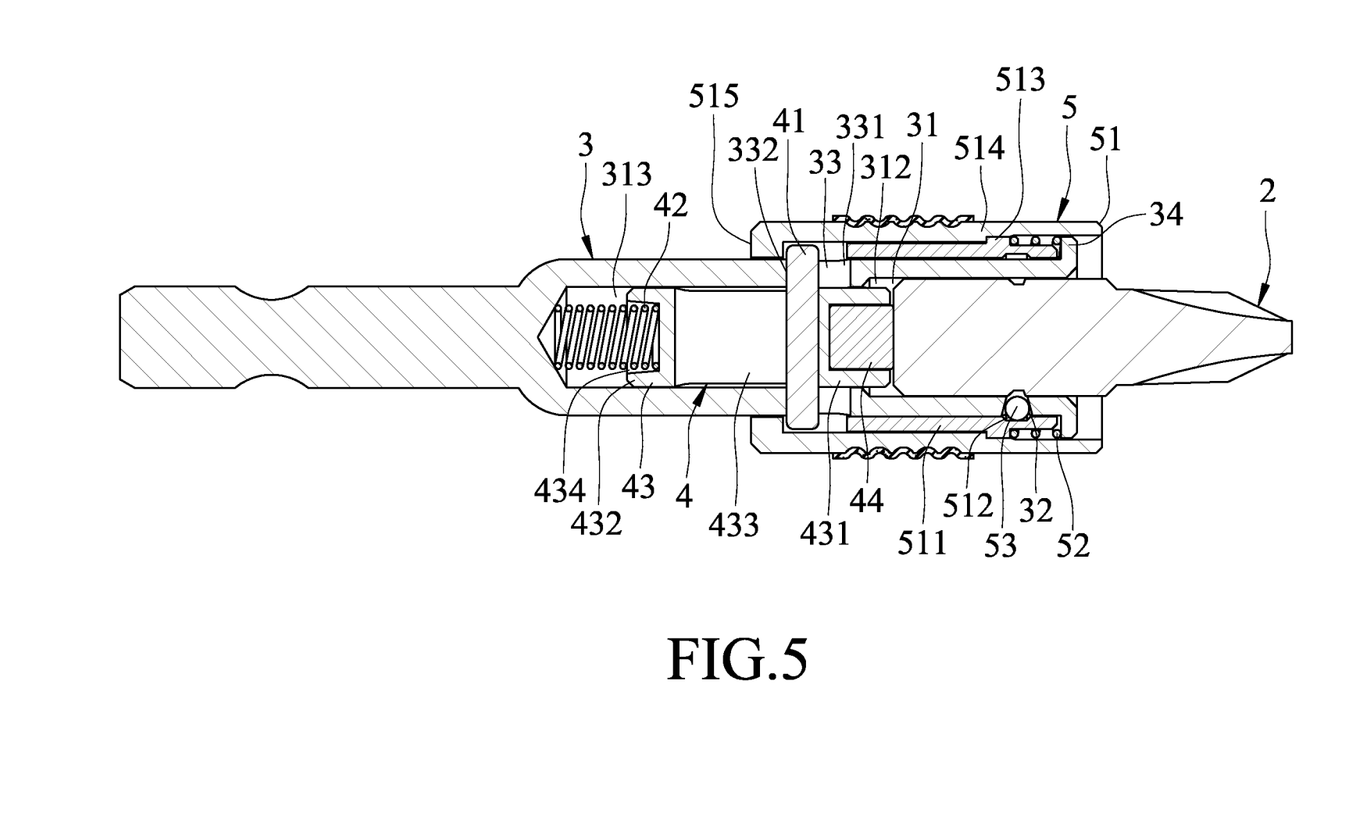
FIGS. 5 and 6 are views similar to FIG. 4 but illustrating a release position of the sliding sleeve, where a screwdriver head can be removed from a rod body by moving a positioning ball.
Figure 6:
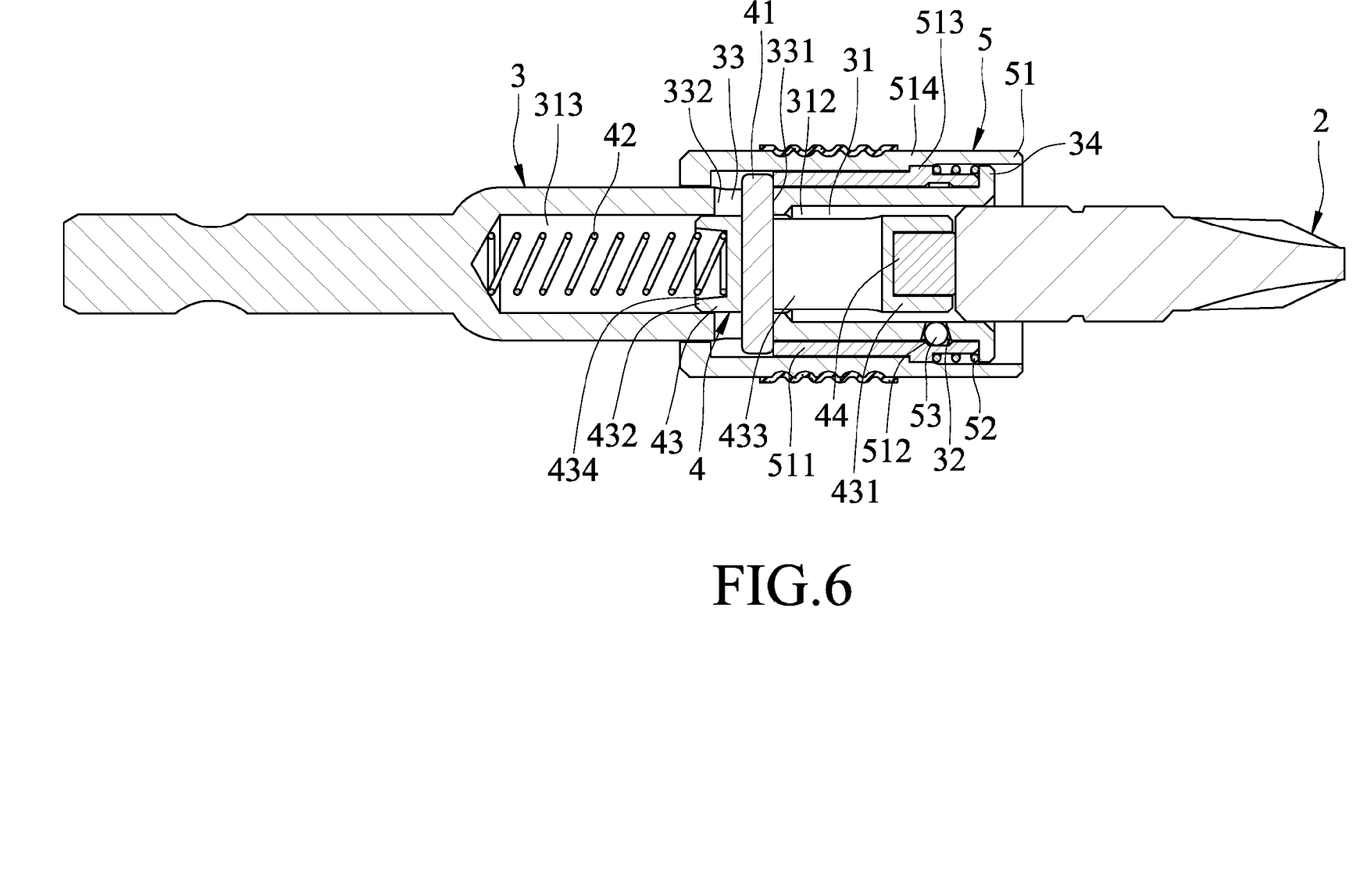

Referring to FIGS. 4 to 6, the sliding sleeve 51 is movable relative to the rod body 3 between a retaining position shown in FIG. 4 and a release position shown in FIGS. 5 and 6.

When the sliding sleeve 51 is disposed at the retaining position, the annular groove 512 is misaligned from the retaining hole 32 so that the positioning ball 53 is disposed within the retaining hole 32 and the ball-engaging groove 21, the screwdriver head 2 is retained within the recess 31, and the guide pin 41 is disposed at the rear end 332 of the slide slot unit 33.

When removal of the screwdriver head 2 is desired, the sliding sleeve 51 is moved forwardly on the rod body 3 until the rear end flange 515 comes into contact with the guide pin 41, as shown in FIG. 5. At this time, the annular groove 512 is aligned with the retaining hole 32, and the sliding member 43 is biased by the first resilient member 42 to move the screwdriver head 2 to move forwardly. Hence, the positioning ball 53 is moved from a groove-engaging position shown in FIG. 5 to a groove-disengaging position shown in FIG. 6, so that it is disengaged from the ball-engaging groove 21 of the screwdriver head 2, and a portion thereof is engaged into the annular groove 512, thereby allowing the screwdriver head 2 to be removed from the rod body 3.

Figure 7:
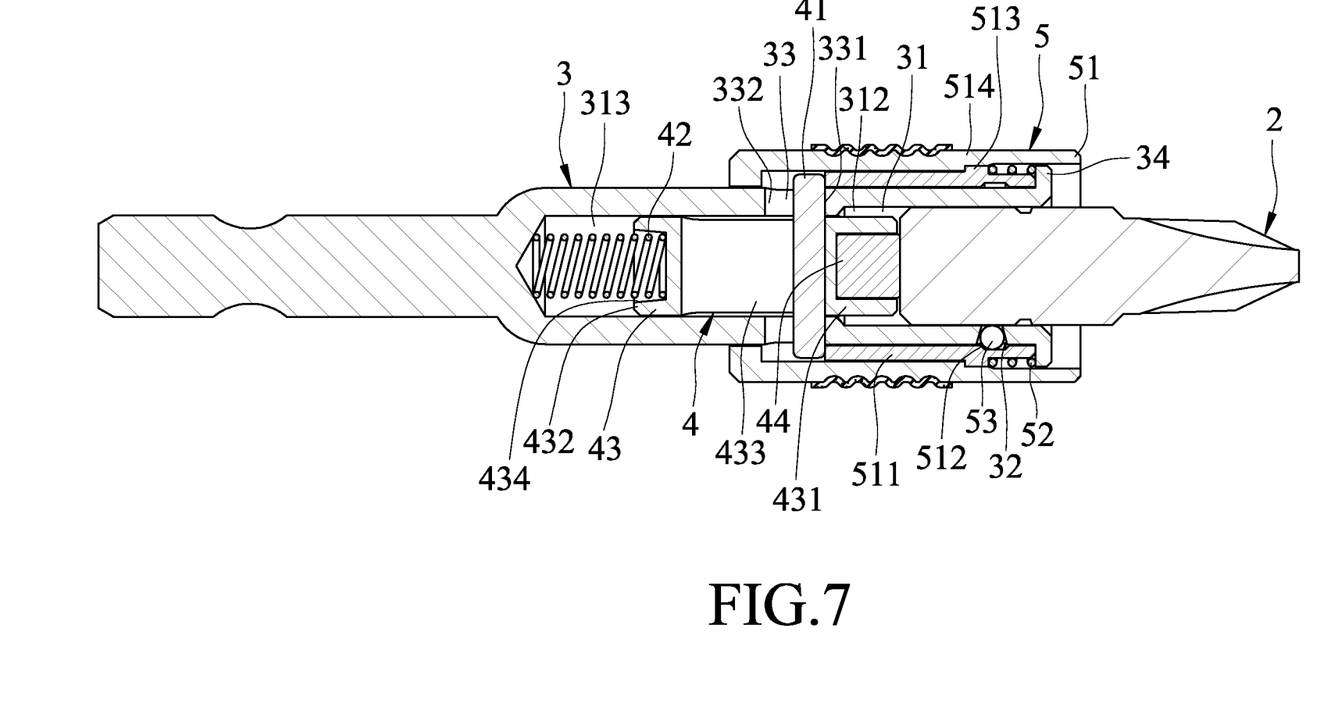
FIG. 7 is a view similar to FIG. 4 but illustrating insertion of the screwdriver head into the rod body.

Subsequently, with reference to FIG. 7, when the screwdriver head 2 is inserted again into the rod body 7, the sliding member 43 is moved rearwardly until a wall defining a front end of the position limiting slot 433 comes into contact with the guide pin 41. At this time, the sliding sleeve 51 is biased by the second resilient member 52 to return to the retaining position, thereby preventing the screwdriver head 2 from moving relative to the rod body 3.

In view of the above, wear experienced by the guide pin 41 cannot affect adversely smooth movement of the sliding member 43. Furthermore, when the sliding sleeve 51 is disposed at the retaining position, as shown in FIG. 4, the two ends of the guide pin 41 abut against a wall defining the rear end 332 of the slide slot unit 33, so as to further facilitate the smooth movement of the sliding member 43.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:

1. A quick removal socket tool adapted for mounting removably a screwdriver head that has an outer surface formed with a ball-engaging groove, the quick removal socket tool including a rod body having a front end surface formed with an axially extending recess, and a retention device for locking releasably the screwdriver head in the recess, characterized by:

the rod body further having a surrounding wall that defines the recess and that is formed with a retaining hole in spatial communication with the recess, and a slide slot unit formed in an intermediate portion of the rod body, in spatial communication with the recess, and having a front end and a rear end;

a driving device including a guide pin extending movably in the slide slot unit and having two ends extending out of the rod body, and a first resilient member biasing the guide pin toward the front end of the slide slot unit; and the retention device including a sliding sleeve that is sleeved movably on the rod body and that has an inner surface formed with an annular groove, a second resilient member biasing the sliding sleeve rearwardly to contact the guide pin and having a spring force smaller than that of the first resilient member, and a positioning ball received within the retaining hole;

wherein the sliding sleeve is movable relative to the rod body between a retaining position and a release position such that, when the sliding sleeve is disposed at the retaining position, the annular groove is misaligned from the retaining hole so that the positioning ball is disposed within the retaining hole and the ball-engaging groove, the screwdriver head is retained within the recess, and the guide pin is disposed at the rear end of the slide slot; and when the sliding sleeve is disposed at the release position, the annular groove is aligned with the retaining hole so that the positioning ball is disposed within the retaining hole and the annular groove, the screwdriver head is removable from the recess, and the guide pin is disposed at the front end of the slide slot;

wherein the recess has an insert recess section permitting the screwdriver head to be inserted thereinto, and a guiding recess section receiving the first resilient member;

wherein the driving device further includes a sliding member disposed movably in the guiding recess section and having an end abutting against the first resilient member, the guide pin extending through the sliding member; and wherein the sliding member has an intermediate portion formed with a position limiting slot that extends forwardly and rearwardly in the rod body, the guide pin extending movably through the position limiting slot such that, when the sliding sleeve is disposed at the retaining position, the guide pin is disposed at a front end of the position limiting slot, and when the sliding sleeve is disposed at the release position, the guide pin is disposed at a rear end of the position limiting slot.

2. The quick removal socket tool as claimed in claim 1, further characterized in that the driving device further includes a magnet fixed within a front end of the sliding member.

3. The quick removal socket tool as claimed in claim 1, characterized in that the sliding member has a rear end surface formed with a spring-engaging groove receiving a front end of the first resilient member.

4. The quick removal socket tool as claimed in claim 1, characterized in that the retaining hole is frusto-conical, and has an inner end proximate to the screwdriver head, and an outer end distal from the screwdriver head and having a diameter greater than that of the inner end.

5. A quick removal socket tool adapted for mounting removably a screwdriver head that has an outer surface formed with a ball-engaging groove, the quick removal socket tool including a rod body having a front end surface formed with an axially extending recess, and a retention device for locking releasably the screwdriver head in the recess, characterized by:
  the rod body further having a surrounding wall that defines the recess and that is formed with a retaining hole in spatial communication with the recess, and a slide slot unit formed in an intermediate portion of the rod body, in spatial communication with the recess, and having a front end and a rear end;
  a driving device including a guide pin extending movably in the slide slot unit and having two ends extending out of the rod body, and a first resilient member biasing the guide pin toward the front end of the slide slot unit; and
  the retention device including a sliding sleeve that is sleeved movably on the rod body and that has an inner surface formed with an annular groove, a second resilient member biasing the sliding sleeve) rearwardly to contact the guide pin and having a spring force smaller than that of the first resilient member, and a positioning ball received within the retaining hole;
  wherein the sliding sleeve is movable relative to the rod body between a retaining position and a release position such that, when the sliding sleeve is disposed at the retaining position, the annular groove is misaligned from the retaining hole so that the positioning ball is disposed within the retaining hole and the ball-engaging groove, the screwdriver head is retained within the recess, and the guide pin is disposed at the rear end of the slide slot; and when the sliding sleeve is disposed at the release position, the annular groove is aligned with the retaining hole so that the positioning ball is disposed within the retaining hole and the annular groove, the screwdriver head is removable from the recess, and the guide pin is disposed at the front end of the slide slot; and
  wherein the rod body further has an end flange extending radially and outwardly from a front end thereof, and the sliding sleeve has a stop flange disposed behind the end flange, the resilient member having two ends abutting respectively against the end flange and the stop flange.

6. The quick removal socket tool as claimed in claim 5, further characterized in that the sliding sleeve has a metallic sleeve portion sleeved movably on the rod body and having a rear end that is movable to contact the guide pin, and a handle portion sleeved fixedly on the metallic sleeve portion, the annular groove and the stop flange being formed at the metallic sleeve portion.

7. The quick removal socket tool as claimed in claim 5, characterized in that the retaining hole is frusto-conical, and has an inner end proximate to the screwdriver head, and an outer end distal from the screwdriver head and having a diameter greater than that of the inner end.

* * * * *